(12) United States Patent
Revanur et al.

(10) Patent No.: US 8,920,654 B2
(45) Date of Patent: Dec. 30, 2014

(54) THIN FILM COMPOSITE MEMBRANES FOR FORWARD OSMOSIS, AND THEIR PREPARATION METHODS

(75) Inventors: Ravindra Revanur, Freemont, CA (US); Iljuhn Roh, San Ramon, CA (US); Jennifer E. Klare, Berkeley, CA (US); Aleksandr Noy, San Carlos, CA (US); Olgica Bakajin, San Leandro, CA (US)

(73) Assignee: Porifera, Inc., Hayward, CA (US)

( * ) Notice: Subject to any disclaimer, the term of this patent is extended or adjusted under 35 U.S.C. 154(b) by 206 days.

(21) Appl. No.: 13/200,780

(22) Filed: Sep. 30, 2011

(65) Prior Publication Data

US 2012/0080378 A1   Apr. 5, 2012

Related U.S. Application Data

(60) Provisional application No. 61/404,302, filed on Sep. 30, 2010, provisional application No. 61/465,871, filed on Mar. 25, 2011.

(51) Int. Cl.
*B01D 39/00* (2006.01)
*B01D 39/14* (2006.01)
(Continued)

(52) U.S. Cl.
CPC ............. *B82Y 30/00* (2013.01); *B01D 61/025* (2013.01); *B01D 2323/40* (2013.01); *B01D 71/56* (2013.01); *B01D 69/06* (2013.01); *B01D 71/021* (2013.01); *C02F 1/445* (2013.01); *B01D 67/0079* (2013.01); *B01D 69/12* (2013.01); *B01D 71/34* (2013.01); *B01D 71/44* (2013.01); *B01D 67/0006* (2013.01);
(Continued)

(58) Field of Classification Search
USPC .............. 210/500.23, 490, 500.27, 500.38, 210/500.36, 502.1, 644; 977/779; 427/244; 264/45.2
See application file for complete search history.

(56) References Cited

U.S. PATENT DOCUMENTS

| 4,326,509 A | 4/1982 | Usukura |
| 4,428,720 A | 1/1984 | Van Erden et al. |

(Continued)

FOREIGN PATENT DOCUMENTS

| JP | 62-140620 A | 6/1987 |
| JP | 2005-138028 A | 6/2005 |

(Continued)

OTHER PUBLICATIONS

Akthakul et al., "Antifouling polymer membranes with subnanometer size selectivity", 2004, pp. 7663-7668, Macromolecules 37.

(Continued)

*Primary Examiner* — Ana Fortuna
(74) *Attorney, Agent, or Firm* — Dorsey & Whitney LLP

(57) ABSTRACT

Forward osmosis membranes having a hydrophilic support layer and a polyamide rejection layer in a thin film composite membrane are considered. Preferred support layer materials include aramid polymers and PVDF. A woven or non-woven mesh can be incorporated into the support layer to improve handling properties of the membrane. Flat sheet and hollow fiber configurations are possible. Antifouling techniques are provided. The polyamide layer can be formed on the hydrophilic support layer by interfacial polymerization. Applications include forward osmosis and pressure retarded osmosis applications, such as industrial product and/or waste concentration, hydration bags, energy/pressure generation, and controlled delivery of chemicals (e.g., for pharmaceutical applications).

13 Claims, 7 Drawing Sheets

(51) Int. Cl.
　　　B05D 5/00　　　　(2006.01)
　　　B29C 33/48　　　(2006.01)
　　　B01D 11/00　　　(2006.01)
　　　B01D 71/56　　　(2006.01)
　　　B01D 69/06　　　(2006.01)
　　　C02F 1/44　　　　(2006.01)
　　　B01D 67/00　　　(2006.01)
　　　B01D 69/12　　　(2006.01)
　　　B01D 71/34　　　(2006.01)
　　　B01D 71/44　　　(2006.01)
　　　B01D 69/10　　　(2006.01)
　　　B01D 69/08　　　(2006.01)
　　　F04B 17/00　　　(2006.01)
　　　B01D 69/14　　　(2006.01)
　　　F04B 19/00　　　(2006.01)
　　　B82Y 30/00　　　(2011.01)
　　　B01D 61/02　　　(2006.01)
　　　B01D 71/02　　　(2006.01)
　　　B01D 61/00　　　(2006.01)

(52) U.S. Cl.
　　　CPC .......... B01D 69/105 (2013.01); B01D 2323/38
　　　　(2013.01); B01D 69/08 (2013.01); F04B 17/00
　　　　(2013.01); B01D 61/002 (2013.01); B01D
　　　　67/0093 (2013.01); B01D 69/125 (2013.01);
　　　　B01D 69/148 (2013.01); F04B 19/00 (2013.01)
　　　USPC ..  210/644; 210/490; 210/500.38; 210/500.27;
　　　　　　　　　　　　　　　　　　　267/45.2; 427/244

(56) References Cited

U.S. PATENT DOCUMENTS

| 4,454,176 | A |  | 6/1984 | Buckfelder et al. |
| 4,618,533 | A |  | 10/1986 | Steuck |
| 4,900,443 | A | * | 2/1990 | Wrasidlo ............... 210/490 |
| 5,593,738 | A |  | 1/1997 | Ihm et al. |
| 6,261,879 | B1 | * | 7/2001 | Houston et al. ............... 438/154 |
| 6,406,626 | B1 |  | 6/2002 | Murakami et al. |
| 6,513,666 | B2 | * | 2/2003 | Meyering et al. ............. 210/490 |
| 6,755,910 | B2 |  | 6/2004 | Knappe et al. |
| 6,849,184 | B1 |  | 2/2005 | Lampi et al. |
| 6,884,375 | B2 | * | 4/2005 | Wang et al. ............... 264/41 |
| 7,177,978 | B2 | * | 2/2007 | Kanekar et al. ............... 711/108 |
| 7,205,069 | B2 |  | 4/2007 | Smalley et al. |
| 7,445,712 | B2 |  | 11/2008 | Herron |
| 7,611,628 | B1 |  | 11/2009 | Hinds, III |
| 7,627,938 | B2 |  | 12/2009 | Kim et al. |
| 7,901,578 | B2 |  | 3/2011 | Pruet |
| 8,029,857 | B2 | * | 10/2011 | Hoek et al. ............... 427/245 |
| 8,038,887 | B2 |  | 10/2011 | Bakajin et al. |
| 8,181,794 | B2 | * | 5/2012 | McGinnis et al. ....... 210/500.38 |
| 8,356,717 | B2 | * | 1/2013 | Waller et al. ............. 210/500.35 |
| 2003/0038074 | A1 |  | 2/2003 | Patil |
| 2004/0004037 | A1 |  | 1/2004 | Herron |
| 2006/0144789 | A1 | * | 7/2006 | Cath et al. ............... 210/641 |
| 2008/0149561 | A1 | * | 6/2008 | Chu et al. ................. 210/500.38 |
| 2008/0210370 | A1 |  | 9/2008 | Smalley et al. |
| 2008/0223795 | A1 |  | 9/2008 | Bakajin et al. |
| 2008/0237126 | A1 | * | 10/2008 | Hoek et al. ............... 210/637 |
| 2008/0290020 | A1 |  | 11/2008 | Marand et al. |
| 2009/0078640 | A1 |  | 3/2009 | Chu et al. |
| 2009/0214847 | A1 |  | 8/2009 | Maruyama et al. |
| 2009/0250392 | A1 |  | 10/2009 | Thorsen et al. |
| 2009/0272692 | A1 |  | 11/2009 | Kurth et al. |
| 2009/0283475 | A1 |  | 11/2009 | Hylton et al. |
| 2009/0308727 | A1 |  | 12/2009 | Kirts |
| 2009/0321355 | A1 |  | 12/2009 | Ratto et al. |
| 2010/0025330 | A1 |  | 2/2010 | Ratto et al. |
| 2010/0051538 | A1 |  | 3/2010 | Freeman et al. |
| 2010/0059433 | A1 | * | 3/2010 | Freeman et al. ........... 210/321.6 |
| 2010/0062156 | A1 |  | 3/2010 | Kurth et al. |
| 2010/0140162 | A1 |  | 6/2010 | Jangbarwala |
| 2010/0155333 | A1 |  | 6/2010 | Husain et al. |
| 2010/0192575 | A1 | * | 8/2010 | Al-Mayahi et al. ............. 60/671 |
| 2010/0206811 | A1 |  | 8/2010 | Ng et al. |
| 2010/0212319 | A1 |  | 8/2010 | Donovan |
| 2010/0224550 | A1 |  | 9/2010 | Herron |
| 2010/0224561 | A1 |  | 9/2010 | Marcin |
| 2010/0320140 | A1 |  | 12/2010 | Nowak et al. |
| 2011/0036774 | A1 |  | 2/2011 | McGinnis |
| 2011/0057322 | A1 |  | 3/2011 | Matsunaga et al. |
| 2011/0073540 | A1 |  | 3/2011 | McGinnis et al. |
| 2011/0186506 | A1 |  | 8/2011 | Ratto et al. |
| 2011/0220574 | A1 |  | 9/2011 | Bakajin et al. |
| 2011/0284456 | A1 |  | 11/2011 | Brozell |
| 2012/0043274 | A1 |  | 2/2012 | Chi et al. |
| 2012/0080378 | A1 | * | 4/2012 | Revanur et al. ............... 210/644 |
| 2012/0080381 | A1 | * | 4/2012 | Wang et al. ................. 210/654 |
| 2012/0234758 | A1 | * | 9/2012 | McGinnis et al. ............. 210/652 |
| 2012/0241371 | A1 |  | 9/2012 | Revanur et al. |
| 2012/0241373 | A1 | * | 9/2012 | Na et al. ................... 210/500.38 |
| 2012/0273421 | A1 | * | 11/2012 | Perry et al. ................... 210/651 |
| 2013/0095241 | A1 |  | 4/2013 | Lulevich et al. |
| 2013/0203873 | A1 | * | 8/2013 | Linder et al. ................... 521/27 |

FOREIGN PATENT DOCUMENTS

| WO |  | 2008/137082 | A1 | 11/2008 |
| WO | WO | 2009/035415 |  | 3/2009 |
| WO |  | 2011028541 | A1 | 3/2011 |
| WO |  | 2012/047282 | A2 | 4/2012 |
| WO |  | 2012/135065 | A2 | 10/2012 |
| WO |  | 2013/059314 | A1 | 4/2013 |
| WO |  | 2014/071238 | A1 | 5/2014 |

OTHER PUBLICATIONS

Zhao et al., "Modification of porous poly(vinylidene fluoride) membrane using amphiphilic polymers with different structures in phase inversion process", 2008, pp. 567-576, J. Membrane Science 310.

Mandal et al., "Drug delivery system based on chronobiology - - - a review", 2010, pp. 314-325, J. Controlled Release 147.

Sotthivirat et al., "Controlled porosity-osmotic pump pellets of a poorly water-soluble drug using sulfobutylether-b-cyclodextrin, (SBE)_7M-b-Cd, as a solubilizing and osmotic agent", 2007, pp. 2364-2374, J. Pharmaceutical Sciences, v96 n9.

Santus et al., "Osmotic drug delivery: a review of the patent literature", 1995, pp. 1-21, J. Controlled Release 35.

Cath et al., "Forward osmosis: principles, applications and recent developments", 2006, pp. 70-87, J. Membrane Science 281.

Yip et al., "High performance Thin-Film Composite Forward Osmosis Membrane", Apr. 21, 2010, pp. 3812-3818, Environ. Sci. Technol. v44.

International Search Report and Written Opinion dated May 1, 2012 for PCT Application No. PCT/US2011/001701.

McCutcheon, et al., "Influence of membrane support layer hydrophobicity on water flux in osmotically driven membrane processes", Journal of Membrane Science, Mar. 2008, pp. 458-466.

Yip, et al., "High Performance Thin-Film Composite Forward Osmosis Membrane", Environmental Science and Technology, Apr. 21, 2010, pp. 3812-3818.

Li, et al., "Electronic properties of multiwalled carbon nanotubes in an embedded vertical array", Applied Physics Letters, vol. 81, No. 5, Jul. 29, 2002, pp. 910-912.

IP Australia Patent Examination Report No. 1 for Appl. No. 2011312881 issued Sep. 12, 2014.

First Office Action of the China State Intellectual Property Office for CN Application No. 201180047473.1 mailed on Sep. 2, 2014.

Yip, Nagai Y. et al., "High Performance Thin-Film Composite Forward Osmosis Membrane", Environmental Science & Technology, vol. 44, No. 10, 2010, Apr. 21, 2010, 3812-3818.

* cited by examiner

THIN FILM COMPOSITE MEMBRANES FOR FORWARD OSMOSIS, AND THEIR PREPARATION METHODS

CROSS REFERENCE TO RELATED APPLICATIONS

This application claims the benefit of U.S. provisional patent application 61/404,302, filed on Sep. 30, 2010, entitled "Carbon Nanotube Thin Film Composite Matrix Membranes for Osmotic Purification, Thin Film Composite Membranes for Forward Osmosis, and Their Preparation Methods", and hereby incorporated by reference in its entirety. This application also claims the benefit of U.S. provisional patent application 61/465,871, filed on Mar. 25, 2011, entitled "Reinforced Thin-Film Composite Hydrophilic Membranes For Forward Osmosis, Hydrophilic Hollow Fiber Membranes For Forward Osmosis, And Reinforced Aligned Carbon Nanotube Membranes For Liquid And Gas Separations", and hereby incorporated by reference in its entirety.

GOVERNMENT SPONSORSHIP

This invention was made with Government support under contract number IIP-1058572 awarded by the National Science Foundation. The Government has certain rights in this invention.

FIELD OF THE INVENTION

This invention relates to membranes for forward osmosis.

BACKGROUND

Forward osmosis is a process where water flows through a permeable membrane from a solution with relatively high water concentration (feed solution) to a solution with relatively low water concentration (draw solution). Membranes for forward osmosis, and for the related process of pressure retarded osmosis, have been under investigation for many years. However, it remains challenging to provide high water flux in combination with other desirable membrane properties, such as low solute flux, resistance to fouling, good mechanical handling properties, etc. Accordingly, it would be an advance in the art to provide improved membranes for forward osmosis and pressure retarded osmosis.

SUMMARY

Thin film composite membranes are used to provide improved forward osmosis (FO) and pressure retarded osmosis (PRO) performance. These membranes include a hydrophilic support layer, which is preferably porous. At least one polyamide rejection layer is formed on a surface of the support layer, thereby forming a thin film composite membrane. As used herein, a "thin film composite membrane" is defined as a membrane that has layers of dissimilar materials joined together to form a single membrane. This layered construction permits the use of material combinations that optimize performance and durability of the membrane. As used herein, "polyamide" is defined as any polymer with R1-C(=O)—NH—R2 linkages that is formed by polymerization between one or more di- or polyfunctional amines and one or more di- or polyfunctional acyl chlorides. This polymerization is preferably interfacial polymerization as described in greater detail below. The di- or polyfunctional amines can be aromatic and/or aliphatic. The di- or polyfunctional acyl chlorides can be aromatic and/or aliphatic.

Preferred options for the support layer material include aramid polymers, such as meta-aramids and mixtures of meta-aramids (e.g., Nomex®) and para-aramids (e.g., Kevlar®). Other preferred options for the support layer material include acrylate-modified poly(vinylidene fluoride) polymers.

A non-woven mesh or a woven mesh can be incorporated into the support layer to improve handling properties of the membranes. However, in some cases it is preferred for no mesh to be included in the support layer.

In some cases, the support layer is sandwiched between two polyamide rejection layers. Practice of the invention does not depend critically on the overall shape of the thin film composite membrane. Flat sheet and hollow fiber configurations are two of the possibilities for this overall shape. For flat sheet membranes, polyamide rejection layers can be on the top surface, the bottom surface, or on both surfaces of the support layer. For hollow fiber membranes, polyamide rejection layers can be on the inner surface of the support layer, the outer surface of the support layer, or on both inner and outer surfaces of the support layer. Carbon nanotubes (CNTs) can be dispersed in the support layer.

The polyamide rejection layer is preferably formed on the hydrophilic support layer by an interfacial polymerization process that is produced by condensation of poly functional acyl halides (for example trimesoyl chloride) and diamine reagents (for example m-phenylenediamine) performed in a way that involves placing the reactants in two immiscible phases and the polymerization occurs only at the interface of the two immiscible phases.

Anti-fouling layers can be deposited on either or both surfaces of the thin-film composite membrane. Preferably, the anti-fouling layer(s) are formed on the thin film composite membrane by exposing the thin film composite membrane to a mixture of dopamine and an anti-fouling polymer.

Some examples of the invention are membrane elements including FO membranes as described above. As used herein, "membrane element" is defined as an assembly that contains a single membrane or multiple membranes arranged in a predefined configuration in a housing that enables fluid or gas handling for an application. Example configurations may include shell, plate-and-frame, spiral-wound, and hollow-fiber bundle.

Membranes and/or membrane elements, according to embodiments of the invention, have various applications. Generally, applications include concentrating industrial product and/or industrial waste using a forward osmosis apparatus comprising one or more FO membranes as described herein. Such applications are expected in industries such as the food and beverage industry, the biofuel production industry, and the oil and gas industry. As an example, a hydration bag can include a thin film composite membrane as described above. Further applications relate to pressure retarded osmosis (PRO), where pressure and/or energy is generated using a PRO apparatus including one or more FO membranes as described herein. Other applications include the controlled release of chemicals, using a controlled release apparatus that comprises one or more FO membranes as described herein. Such controlled release applications are of interest for drug delivery and other pharmaceutical applications.

DETAILED DESCRIPTION

The following description provides greater detail relating to embodiments of the invention. The table of contents is given by:

Section A provides greater detail and examples relating to general principles of the present approach as well as the particular flat sheet approach.

Section B relates to the hollow fiber approach.

Section C describes various applications of the present approach.

Example 1 relates to the flat sheet membrane fabrication according to the present approach and performance comparisons of these membranes with commercial FO membranes.

Example 2 relates to a configuration having carbon nanotubes incorporated into a support layer.

Example 3 relates to a acrylate-modified poly(vinylidene fluoride) polymer support layer (the other examples relate to meta-aramid support layers).

Example 4 relates to the preparation of the hollow fiber FO membranes according to the present approach.

Example 5 relates to the anti-fouling measures that can be practiced in preferred embodiments.

Example 6 provides further details relating to use of embodiments of the invention in hydration bags.

Figure 1A:
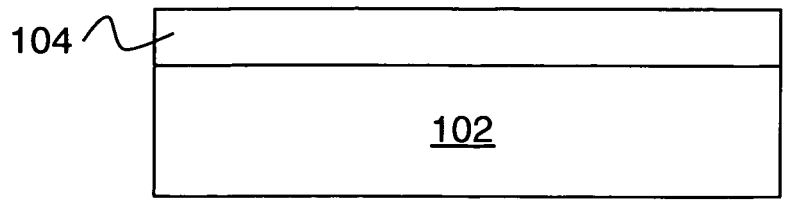
FIGS. 1a-d show several flat sheet embodiments of the invention.

Section A. General Approach for Membranes for Forward Osmosis and Flat Sheet Membranes for Forward Osmosis An exemplary membrane structure, shown on FIG. 1a, includes a (preferably 50-500 nm thick) polyamide barrier layer 104 on top of a (preferably 30-150 micrometer) hydrophilic support layer 102 (e.g., porous Nomex® (poly-meta-phenylene isophthalamide)). More specifically, the material of polyamide barrier layer 104 is a polymer with R1-C(=O)—NH—R2 linkages that is formed by polymerization between one or more di- or polyfunctional amines and one or more di- or polyfunctional acyl chlorides. This polymerization is preferably interfacial polymerization as described in greater detail below. The di- or polyfunctional amines can be aromatic and/or aliphatic. The di- or polyfunctional acyl chlorides can be aromatic and/or aliphatic. Preferred material options for support layer 102 include aramid polymers, such as meta-aramids and mixtures of meta-aramids (e.g., Nomex®) and para-aramids (e.g., Kevlar®). Other preferred options for the support layer material include acrylate-modified poly(vinylidene fluoride) polymers.

Figure 1B:
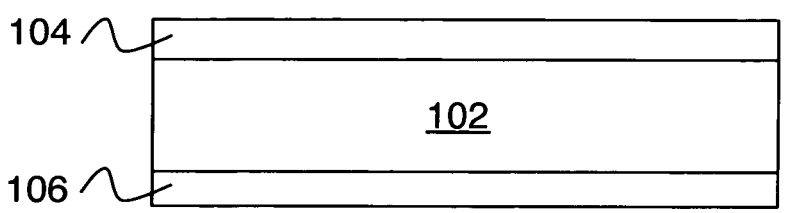

FIG. 1b shows a sandwich structure, with polyamide layers 104 and 106 sandwiching the hydrophilic support layer 102. These structures provide enhanced performance for forward osmosis applications. The enhanced performance stems from a combination of a hydrophilic highly permeable support layer formed by phase inversion method and a thin high-rejection polyamide layer formed by interfacial polymerization.

These forward osmosis membranes have a thin film composite (TFC) architecture that includes a hydrophilic support layer incorporating meta-aramid (e.g. Nomex®) or other hydrophilic polymers that is covered with a thin layer of polyamide that enhances the membrane rejection performance. Meta-aramid or similar hydrophilic membrane support materials offer several advantages over state-of-the art materials (such as polysulfone), such as (1) excellent membrane formability and flexibility, (2) enhanced chemical resistance, (3) enhanced structural stability, (4) hydrophilicity, which could result in enhanced anti-fouling property, and enhanced flux through the membrane in several types of application (e.g. forward osmosis). The meta-aramid polymer layer also may incorporate functionalized or unfunctionalized carbon nanotubes to enhance the membrane performance.

Figure 1C:
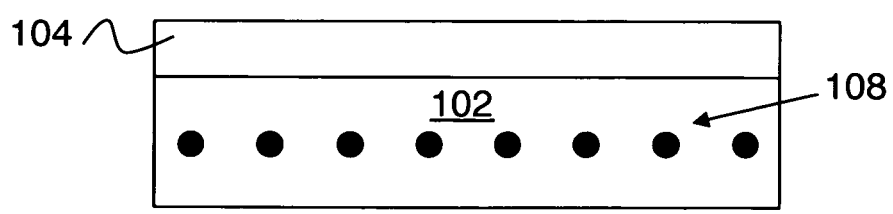

While the composite membrane of this architecture shows enhanced flux and rejection properties, its mechanical strength may not be suitable for all applications. The present work solves this problem by incorporating a reinforcing mesh structure into the support layer. An example is shown on FIG. 1c, where mesh 108 is incorporated into support layer 102. The mesh (which could be either woven or non-woven) gives the membranes mechanical stability and handling capability without significantly affecting the membrane separation performance. Unlike the conventional non-woven support structure used in preparation of the reverse osmosis membranes, the non-woven support in the FO membrane is embedded in the polymeric membrane. The density of the non-woven support for the fabrication of TFC FO membrane is about 5 g/sq meter to 60 g/sq meter, preferably about 10 g/sq meter to 40 g/sq meter. The thickness of the nonwoven support is about 20 microns to 100 microns, preferably 30 to 70 microns. For the woven support the preferred mesh count is 70 to 170 number/cm, and thickness of 30 to 100 microns.

In one embodiment, an FO membrane that has a meta-aramid support layer and a polyamide rejection layer has an advantage for many applications because of its high resistance to high or low pH fluids.

Figure 1D:
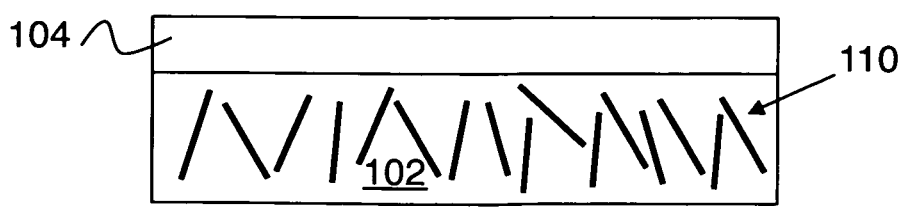

In this work we also describe a way to incorporate ultra thin polyamide layers on a reinforced hydrophilic polymer support (meta-aramid (e.g. Nomex®)) using the interfacial polymerization method. A conventional use of this process described in research and trade industry reports only considered the procedure of making polyamide layers on hydrophobic polymer supports (example polysulfone). Making the same layers on hydrophilic support is a significant challenge due to the phase separation and mismatch in the swelling properties. Our examples circumvent this challenge by using polymeric support that provides a chemically similar surface to the polyamide, or by providing a hydrophilic rough surface to anchor the interfacially polymerized layer, or by providing a combination of both. The hydrophilic support layer may or may not incorporate functionalized or unfunctionalized carbon nanotubes to enhance the permeability. FIG. 1d shows an example of carbon nanotubes 110 incorporated into support layer 102.

This invention also includes methods of enhancing the anti-fouling properties of TFC-FO membranes by coating them with a mixture of dopamine and anti-fouling polymers. The use of antifoulant polymers alone on the membrane is problematic because of their poor attachment to the IP layer. The addition of dopamine to the reaction mixture enables the formation of a more stable coating. Prior art used dopamine to help with antifouling polymer attachment, but in those studies the membranes were coated in two consecutive steps (first with dopamine adhesion layer, then with an antifouling polymer graft). The present approach accomplishes it in one step and preserves the transport properties of the FO membrane.

Figure 2A:
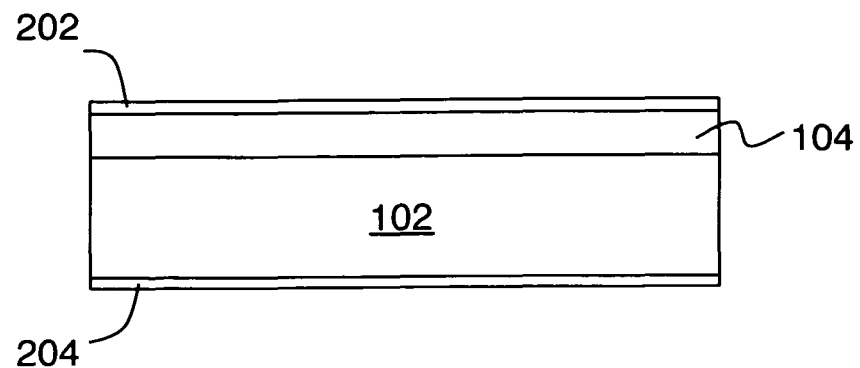
FIGS. 2a-b show examples of embodiments of the invention including anti-fouling layers.
Figure 2B:
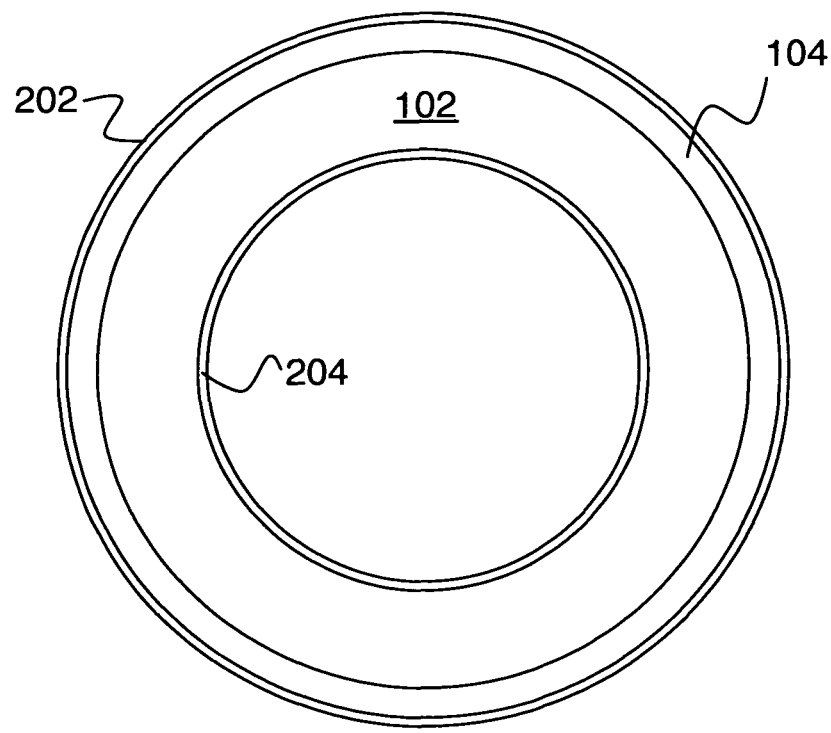

FIGS. 2a-b show examples of this approach. In these examples, anti-fouling layers 202 and 204 are deposited on both surfaces of a thin film composite membrane including hydrophilic support layer 102 and polyamide rejection layer 104. FIG. 2a relates to the flat sheet configuration, and FIG. 2b relates to the hollow fiber configuration described below. Addition of anti-fouling layers does not depend critically on details of the thin film composite membrane—for example, anti-fouling layers can be deposited on either or both surfaces of any of the examples of FIGS. 1a-b and FIGS. 3a-c.

Section B. Hollow Fiber Membranes

Figure 3A:
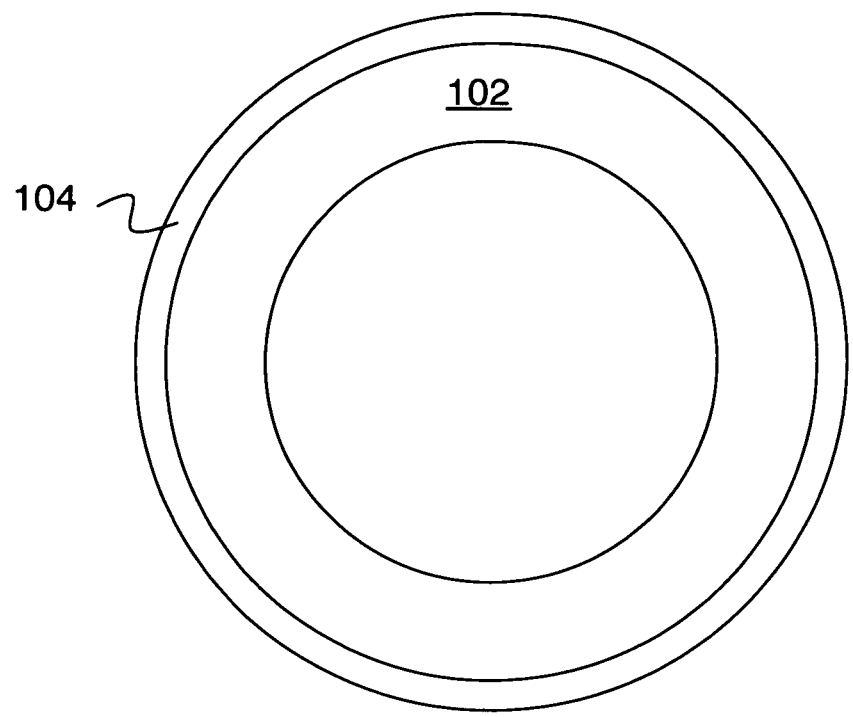
FIGS. 3a-c show several hollow fiber embodiments of the invention.
Figure 3B:
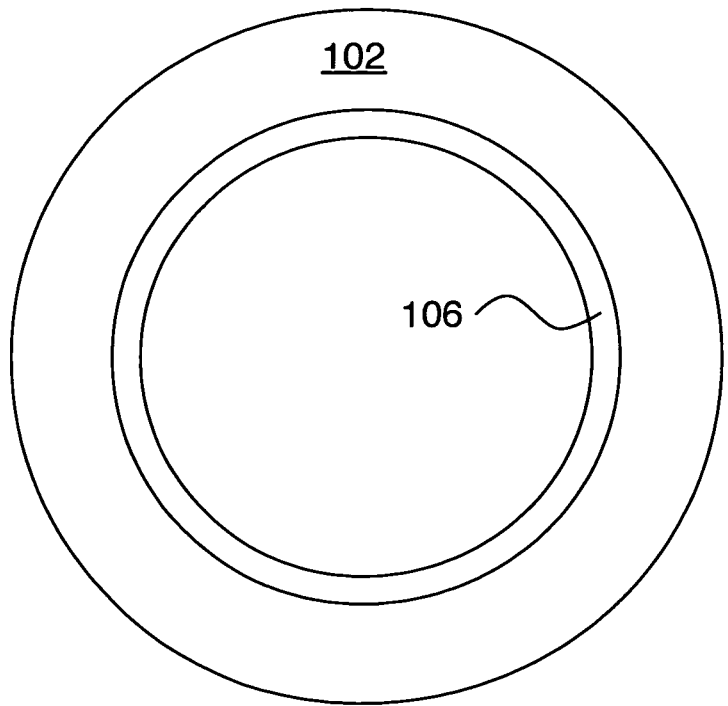
Figure 3C:
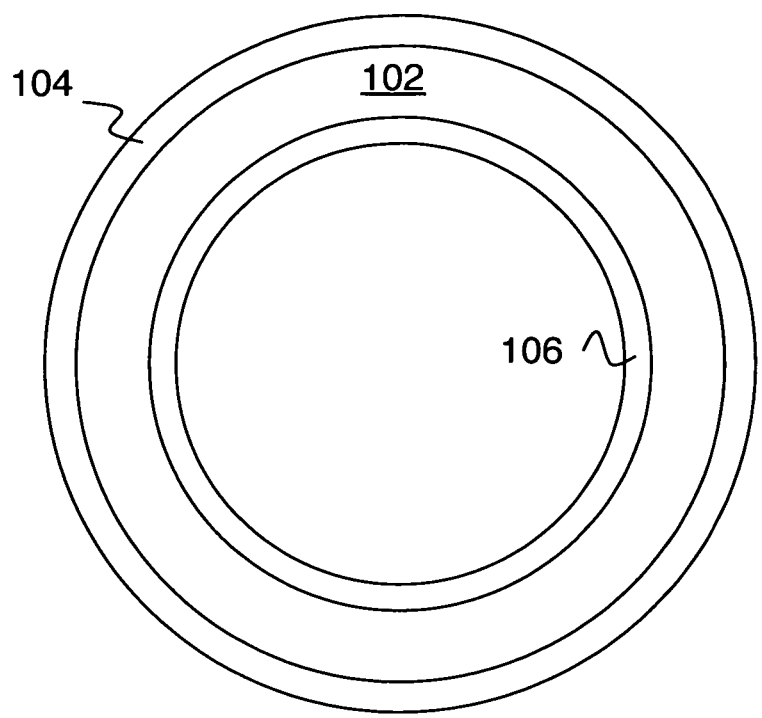

Another embodiment of this invention is a hollow fiber composite membrane. This membrane has a composite structure, which includes thin barrier layer(s) on the surface(s) of the support layer. The support membrane layer can be fabricated with hydrophilic polymer(s), such as meta-aramid (e.g. Nomex®) with or without carbon nanotubes by phase inversion method. The thin barrier layer can be synthesized on one surface of the support membrane (e.g., inner surface or outer surface) or on both surfaces of the support membrane by interfacial polymerization. FIG. 3a shows an example where the polyamide rejection layer 104 is on the outer surface of support layer 102. FIG. 3b shows an example where the polyamide rejection layer 106 is on the inner surface of support layer 102. FIG. 3c shows an example where polyamide rejection layers 104 and 106 are on both surfaces of support layer 102. Making stable polyamide layers on hydrophilic hollow fiber support is a significant challenge due to delamination and mismatch in the swelling properties. Our example circumvents this challenge by using polymeric support that provides a chemically similar surface to the polyamide, or providing a microporous rough surface structure to anchor the interfacially polymerized layer, or by providing a combination of both. Optionally, carbon nanotubes can be incorporated into the polymer of the support layer to alter the flow characteristics of the membrane.

Section C. Applications

Figure 4A:
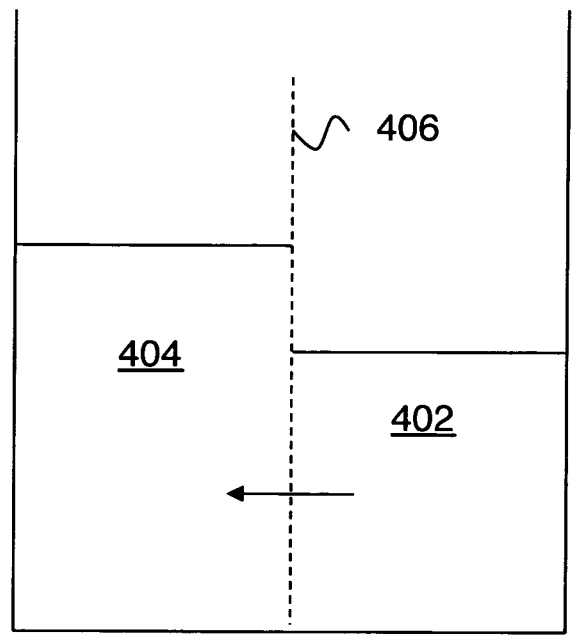
FIGS. 4a-b show operation of forward osmosis (FO) and pressure retarded osmosis (PRO) embodiments of the invention.

In general, membranes according to embodiments of the invention are suitable for use in any forward osmosis (FO) application or in any pressure retarded osmosis (PRO) application. FIG. 4a shows an example of forward osmosis. In this example, a draw solution 404 (e.g., high concentration brine) is separated from a feed solution 402 (e.g., fresh water or low concentration waste water) by an FO membrane 406 (e.g., membranes of the kind described herein). Since membrane 406 is permeable to water, and the water concentration is higher in feed solution 402 than in draw solution 404, the difference in the osmotic pressure between the two solutions drives water to flow through membrane 406 by forward osmosis.

Figure 4B:
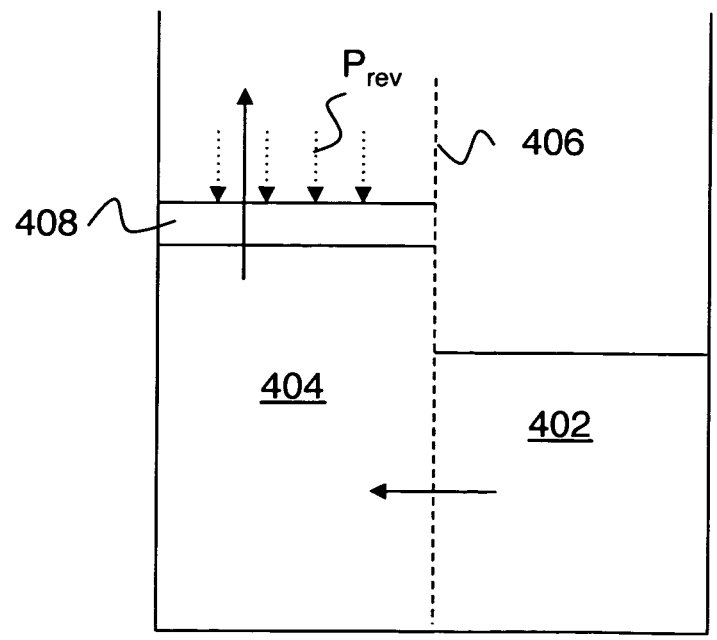

FIG. 4b shows an example of pressure retarded osmosis. This example is similar to the example of FIG. 4a, except that a piston 408 is placed on the draw solution side, and a pressure $P_{rev}$ is applied to the piston that pushes against the osmotic flow. However this pressure is not sufficient to stop or reverse the flow of water across membrane 406. Instead piston 408 moves against the direction of $P_{rev}$, as shown, so mechanical work can be performed by this arrangement. Equivalently, energy can be generated by using the pressure developed in the PRO apparatus.

Figure 5:
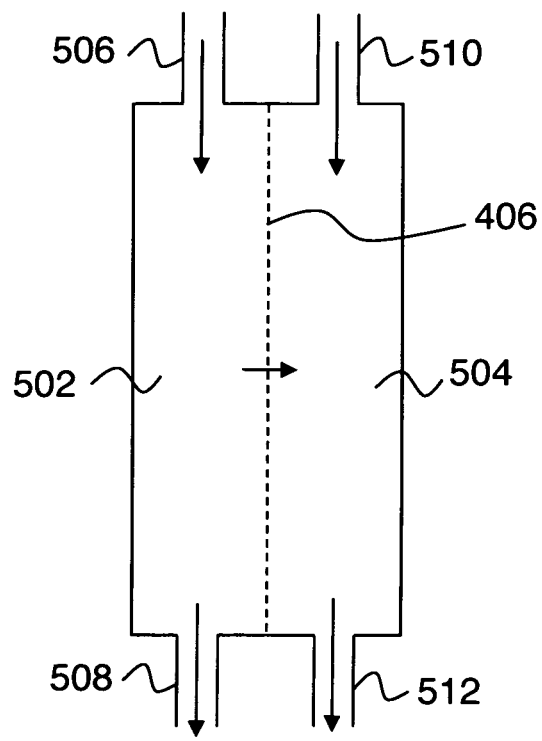
FIG. 5 shows an example of a membrane element according to an embodiment of the invention.

Typically, an FO membrane needs to be appropriately mounted to provide sufficient fluid flow and mechanical support in applications. It is convenient to refer to the combination of an FO membrane with such a mount as a "membrane element". FIG. 5 shows a generic example of a membrane element. In this example, a feed side 502 is separated from a draw side 504 by a FO membrane 406. On the feed side, an inlet 506 and outlet 508 control the feed solution flow. Similarly, on the draw side, an inlet 510 and outlet 512 control the draw solution flow. Practice of the invention does not depend critically on details of the membrane element. Various membrane mounting approaches are known in the art and are suitable for use with the thin film composite membranes described herein.

Figure 6:
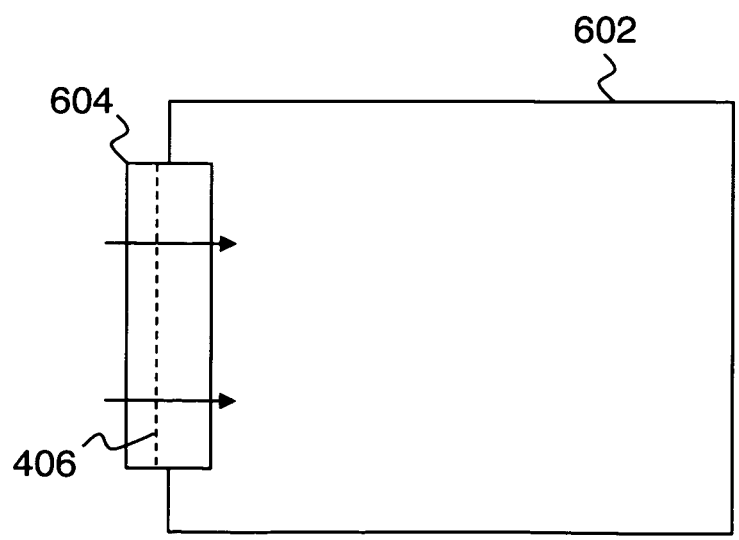
FIG. 6 shows a hydration bag according to an embodiment of the invention.

The above-described membranes have numerous specific applications. For example, FIG. 6 shows a hydration bag example. Here a bag 602 has FO membrane 406 included in a suitable membrane element 604 for the hydration bag application. In one embodiment, the membrane 406 is sealed to a sheet of plastic or to another sheet of membrane using glue or thermal welding or ultrasonic welding and a dose of a high concentration draw solution is placed in the bag 602. In one example, the draw solution is a concentrated nutritious drink mix initially placed inside bag 602. The bag is then placed in an untreated source of water, and the osmotic gradient between the source and the solution in the bag is used to draw water into the bag, producing a nutritious drink ready for consumption. Another embodiment uses the membrane sealed in a cartridge to dilute a supplied concentrate solution (nutritious drink or other concentrate) at the point of manufacture or point of sale to produce a suitably diluted drink in places where a certified or clean water source is not available or not economical to use. On a large scale, this application could be used by a beverage bottling plant for treating wastewater and/or creating bottled beverage products. Beverage dispensers could be created that treat water by using the beverage syrup as the draw and then dispensing the beverage.

An application in the food industry could use these membranes to remove or recover water during the manufacturing of food products. They could be used to create juice concentrates, or to dewater high-water content foods, such as potatoes or tomatoes.

Another embodiment uses a premade bag charged with electrolyte draw solution to produce sterile saline bags for in the field medical applications.

Other applications include wastewater treatment applications, energy generation using pressure retarded osmosis, direct desalination using a draw solution that can be removed via heating or use of magnetic or other fields, water recycling, and produced water applications. For example, the membrane and membrane modules can be used in conjunction with a draw solution to pull wastewater through the membrane using osmotic gradient as a driving force. The permeate can then be recycled as part of a manufacturing process or systemic process that in effect reduces the overall water requirements needed.

These membranes and membrane cartridges can also be used as part of the pre-treatment system for reverse osmosis applications, providing a highly fouling resistant separation medium and resulting in a double-tight membrane barrier between processed and produced water, that may reduce concentration of hard to remove contaminants such as Boron.

Example 1

Preparation and Performance of Composite FO Membranes

This example describes the preparation of a membrane according to the present approach as well as variations of this approach that allow tuning of the permeability and the reverse salt flux characteristics of the membrane. It also shows a comparison of this membrane performance to several commercially available FO membranes. The three commercial membranes considered are membrane models HTI-NW, HTI-ES and HTI-HydroWell from vendor HTI (Hydration Technology Innovations). The three membranes according to the present approach that are considered in this example are named Porifera-IP-1, Porifera-IP-2, and Porifera-IP-3.

General Membrane Preparation Procedure

Without losing generality, we provide a procedure that was used to prepare the membrane Porifera-IP-2. While variations in the exact composition of the solutions used in these procedures may alter certain properties of the membrane, they are not critical for practicing this invention.

Step 1: Support preparation. A 7-15 wt % Nomex® (Red Seal or Dupont) solution was prepared by dissolving Nomex® polymer in Dimethylacetamide-Lithium Chloride (DMAc—LiCl) salt solution at 100 deg C. under constant stirring for 4 hrs. Salt concentration in DMAc was maintained at 2.5-5.0 wt %. The polymer solution was then stored in a desiccator for at least 10 h prior to casting. Other solvents that could be used for preparation of polymer solution are N-methyl-2-pyrrolidone (NMP), Dimethysulfoxide (DMSO), and Dimethylformamide (DMF).

The polymer solution was cast on a clean glass plate or on about 40 microns thick woven or nonwoven polymer support to a thickness of 50-150 microns and dried at 70 deg C. for 0-5 minutes. The membrane was immediately immersed in a water precipitation bath at room temperature to initiate the phase separation. The membrane was allowed to remain in the precipitation bath for 1 hr or until the salts present in the polymer solution are removed. The wet membrane support thickness was about 30-100 microns.

Step 2: Barrier Layer Formation by Interfacial Polymerization.

Support membranes were partially dried for 3-8 minutes and then were mounted on a frame support. A small amount of aqueous phase solution was spread on it. Aqueous phase solution composition was 1.5 wt % 1,3 phenylenediamine (MPDA), 1.5 wt % of DABA (diaminobenzoic acid), 1 wt % triethylamine (TEA), 1 wt % sodium dodecylbenzenesulfonate (SDBS), and 6 wt % Camphor-10-Sulfonic acid (CSA) in water. After 2-5 minutes, the solution was drained and the remained excess was squeezed off. Next, the membrane was wetted with excess organic phase solution, consisting of 0.1 wt/vol Benzenetricarbonyl trichloride (TMC) in 10 vol % Isopar, 10 vol % chloroform, and 80 vol % hexane solution, for 1-2 minutes. The excess organic solution was drained off and the membrane was cured in the oven between 90 and 135° C. for 1-5 minutes. Residual chemicals were removed by soaking in a water bath.

Porifera-IP-1 membrane was prepared using the same procedure for the support preparation and interfacial polymerization, except the solvent composition for the organic phase solution was 10 vol % Isopar, and 90 vol % hexane. This membrane exhibits lower reverse salt flux and lower water permeability than the Porifera-IP-2 membrane.

Porifera-IP-3 membrane was prepared using the same procedure for the support preparation and interfacial polymerization, except the solvent composition for the organic phase solution was 5 vol % Isopar, 15 vol % chloroform, and 80 vol % hexane. This membrane exhibits higher reverse salt flux and higher water permeability than the Porifera-IP-2 membrane.

Figure 7:
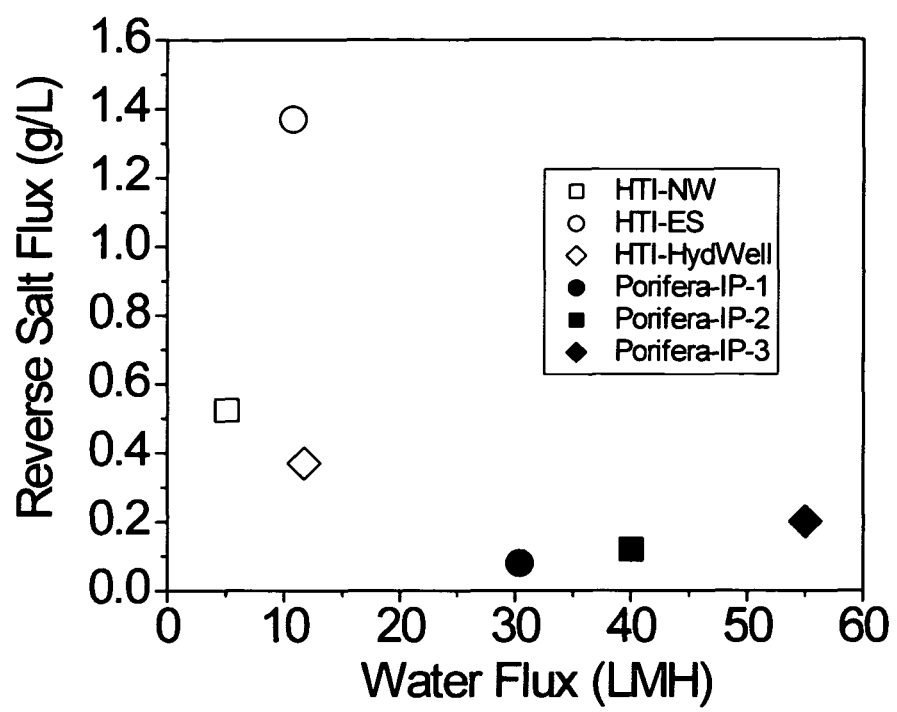
FIG. 7 shows comparison results relating to embodiment of the invention.

FIG. 7 shows Porifera-IP-1, Porifera-IP-2, Porifera-IP-3 membrane performance in Forward Osmosis tests compared to the performance of commercial FO membranes in the same test.

Additional variations of the procedures described in this example can be implemented to provide further improvements/variations in membrane performance characteristics.

1) 0-5 wt % of polyvinylpyrrolidone (PVP) can be added to the polymer solution used to cast the support membrane. This addition typically results in 20-30% higher water flux of the membrane. After preparation the support membrane may also be treated with isopropanol for 1 hour. This procedure was used to prepare the membrane Porifera-IP-4.

2) 0-5% wt % of glycerol can be added to the polymer solution used to cast the support membrane. This addition typically results in 20-30% decrease in the reverse salt flux as well as 10-30% increase in water permeability. This procedure was used to prepare the membrane Porifera-IP-5.

Table 1 below shows Porifera-IP-1, Porifera-IP-2, Porifera-IP-3, Porifera-IP-4 and Porifera-IP-5 membrane performance in Forward Osmosis tests compared to the performance of commercial FO membranes in the same test.

TABLE 1

Membrane performance in Forward Osmosis tests

| | Membrane | Flux (LMH) | | Reverse Salt Flux (g/L) | |
|---|---|---|---|---|---|
| | | Skin side to draw | Skin side to water | Skin side to draw | Skin side to water |
| 1 | Commercial membrane 1 (HTI-NW) | 4.8 | 5 | 0.63 | 0.525 |
| 2 | Commercial membrane 2 (HTI-ES) | 11.2 | 5.1 | 1.48 | 1.37 |
| 3 | Commercial membrane 3 (HTI-Hydrowell) | 20.5 | 11.7 | 0.4 | 0.37 |
| 4 | Porifera-IP-1 | 40.2 | 30.4 | 0.08 | 0.08 |
| 5 | Porifera-IP-2 | 60.1 | 40 | 0.14 | 0.12 |
| 6 | Porifera-IP-3 | 75 | 55 | 0.25 | 0.2 |
| 7 | Average of 15 membranes prepared using Porifera-IP-2 procedure | 60 ± 2 | 40 ± 1.5 | 0.12 ± 0.03 | 0.1 ± 0.02 |
| 8 | Porifera-IP-4 | 80 | 60 | 0.5 | 0.4 |
| 9 | Porifera-IP-5 | 55 | 35 | 0.06 | 0.06 |

All FO tests were done with a 1.5M NaCl draw solution and pure water as a feed solution. The test was conducted in a laboratory setup equipped with a flow cell and circulation pump to initiate low-speed cross-flow over the membrane coupon.

Example 2

Preparation of Composite FO Membranes Incorporating Carbon Nanotubes in the Membrane Support.

The preparation procedure is similar to the Example 1, except that the polymer mixture may incorporate 0.1-3 wt % of carbon nanotubes that may or may not be functionalized with additional compounds to improve nanotube solubility and the stability of their dispersions.

Example 3

PVDF Support Membrane

A 8-20 wt % of hydrophilic poly(vinylidene fluoride) (PVDF) polymer can be dissolved in dimethylformamide (DMF) and/or dimethylacetamide solvent mixture at 50-70 deg C. for 2-4 hrs under constant stirring until a clear PVDF polymer solution forms.

Clear and bubble free PVDF solution can be cast on a ca. 40-100 microns thick PET/Nylon mesh or nonwoven polymer support, or a clear glass plate, to a thickness of 50-150 microns. The cast film then can be immediately immersed into a water precipitation bath maintained at room temperature to initiate the phase separation. The support membrane is allowed to remain in the precipitation bath for 1-5 hr to remove solvent. After that, it is transferred into an isopropanol bath and stored there. The wet membrane support thickness is about 30-100 microns. The polyamide barrier layer is then formed on the support according to the procedure described in Example 1.

Example 4

Preparation of Hollow Fiber FO Membranes

The preparation procedure for composite hollow fiber membranes includes:

1) Making a polymer dope solution including hydrophilic polymer(s), inorganic salt, and solvent and a bore solution having non-solvent or mixture of non-solvent and solvent for the polymer. The polymer dope solution can include hydrophilic polymers, polymer additives, salt, and solvents. Example of the hydrophilic polymer is linear 1,3-aromatic polyamide (Nomex®), 1,4-aromatic polyamide (Kevlar®), or acrylate-modified poly(vinylidene fluoride). The concentration of the hydrophilic polymer is about 3 to 30 wt %, preferably about 5 to 25 wt %. To adjust the viscosity of dope solution and control the microstructure of the porous support membrane, additives can be added into the dope solution. An example of the additive is polyvinylpyrrolidone. The concentration of the additive polymer is about 0 to 30 wt %, preferably about 0 to 20 wt %. An inorganic salt (such as LiCl) of about 0 to 10 wt % also can be added to the dope solution, preferably about 1 to 7 wt %. The solvents for making homogeneous dope solution are N-methyl-2-pyrrolidone (NMP), N-methyl acetamide (DMAc), Dimethysulfoxide (DMSO), and Dimethylformamide (DMF). An example of the composition of the bore solution is a solvent for the polymer, and mixture of solvent and non-solvent of the polymer. Example of non-solvent is water, alcohol, and glycerin and their mixtures.

2) Spinning hollow fiber using tube-in orifice type spinneret by extrusion of dope solution from the outside tube and bore solution from the hole of the spinneret tube and then introducing the nascent hollow fiber into a water bath.

3) Forming a barrier polyamide layer according to the general procedures of Example 1. Excess aqueous solution can be removed from the surface of the support membrane by pressurized air, or by gravity flow, or by mechanical squeezing.

Example 5

Procedure for Formation of Antifouling Coating on the Membrane Surface

The following materials were used for the preparation of antifouling coatings in this example:

1) Polymer A: Polyetheramine (trade name JEFFAMINE) (Jeffamine monoamines, Jeffamine diamines, Jeffamine Triamines consisting of polyethylene glycol (PEG) with approximate molecular weights in between 1000 and 5000 Da. JEFFAMINE monoamine was obtained from Huntsman Corporation, USA)

2) Polymer B: Methoxy PEG Amines (Methoxy PEG Amines, PEG diamines with PEG molecular weights in between 500 and 5000 was obtained from JenKem Technology Corporation Limited, USA).

3) Polymer C: Poly(cyclooctene-graft-phosphorylcholine) was obtained from Todd Emrick, Polymer Sci Dept, University of Massachusetts, Amherst, Mass., USA.

1-20 mg/mL Polymer A, B or C was dissolved in 10-50 mM Tris-HCL buffer solution (8-10 pH range). After 1-4 mg/mL dopamine was added to this solution, it was poured onto an FO membrane attached to a frame and the frame was agitated for 5-30 minutes to achieve uniform coating of the polymer. In a variation of this procedure, forward osmosis TFC membranes can be soaked with gentle agitation in polymer-dopamine solution for 5-30 minutes. The latter procedure produces the FO membrane coated on both sides with antifouling polymer. The excess and unreacted components were removed by first washing the membrane with excess water then soaking in isopropanol for 1-4 hrs.

To evaluate the irreversible fouling resistance of FO membranes, the membranes were exposed to a solution of a polymeric foulant for 3 hours. The membrane performance before and after this exposure was evaluated in the forward osmosis test using 1.5 NaCl draw solution and DI water feed solution (Table 2).

TABLE 2

Antifouling coating performance.

| Membrane | Before exposure to foulant | | After exposure to foulant | | Flux decrease due to irreversible fouling |
|---|---|---|---|---|---|
| | Flux (LMH) | Reverse Salt Flux (g/L) | Flux | Reverse Salt Flux | |
| Porifera Modified with Polymer A. | 32.5-35.4 | 0.12-0.16 | 31.5-28.3 | 0.17-0.3 | 3-25% |
| Porifera Unmodified | 33.4-38.4 | 0.15-0.25 | 13.5-9.7 | 0.3-0.6 | >60% |
| HTI | 12.2-13.2 | 0.3-0.4 | 4.7-6.1 | 0.7-0.9 | >55% |

Example 6

Preparation of FO Membrane Based Drinking/Hydration Bags

This example describes preparation and use of a drinking pouch that can be used for quick generation of potable nutritious drinks in the field. This pouch contains a sealed high osmolarity draw solution including electrolytes and nutritious chemicals (for example sugars). One of the advantages of this kind of pouch that incorporates a window made of the membrane prepared as described herein is that it enables the bag to fill up fast (under 30 min time for a typical personal-size drink volume). This pouch can also be prepared and packaged in a form factor that imitates a conventional drink or a sports drink, thus making it more attractive for consumer sales.

These FO bags can be prepared by hot melt sealing or glue sealing, or ultrasonic welding. Two FO membranes or one FO membrane with a transparent plastic film were stacked with a protective polyester or polyamide mesh, fabric, or nonwoven fabric. This stack was pressure-sealed at the edges using a hot-melt apparatus. The temperature of the heating apparatus was about 300° C. to 500° C., preferably 350° C. to 420° C. The heating time was about 1 second to 50 seconds, preferably about 3 seconds to 20 seconds. Before the last edge was sealed, the powder-form mixture of sugars and other nutritious chemicals was placed into the bag. This powdered mix can be replaced by a high-concentration syrup solution.

To prepare the bag using glue sealing the glue was placed on the three edges of the FO membrane and then another sheet of FO membrane or a transparent plastic film was added on top of the membrane. The glue area was pressurized to ensure a tight and even seal and cured in an oven at temperatures between room temperature to 100 deg for 1-3 hours. The nutritious chemicals in powder or liquid form were placed in the bag prior to final sealing using procedure similar to what is described for the hot melt sealing.

A strip of closed cell foam or other materials can also be glued onto the edges of the bag to improve its flotation properties and hold the bag in the proper orientation to ensure full utilization of the membrane area. Table 3 compares the performance of the bags that use Porifera FO membrane with the bags that use commercial FO membrane made by Hydration Technology Innovations (HTI).

TABLE 3

Comparison of FO performance of membrane bag according to embodiments of the invention and a commercial FO membrane bag.

| | Porifera FO membrane bag | HTI FO membrane bag (HydroPack ™) |
|---|---|---|
| Membrane area | 10.0 × 16.5 cm$^2$ | 10.5 × 16.5 cm$^2$ |
| Powder | 30 g of the electrolyte and nutrition powder | 30 g of the electrolyte and nutrition powder |
| Water | Tap water | Tap water |
| Water temperature | 21° C. | 21° C. |
| Water uptake Immersion in water for 10 min | 38.7 g | 10.7 g |
| Immersion in water for 20 min | 75.1 g | 19.0 g |
| Immersion in water for 30 min | 110.8 g | 27.1 g |
| Immersion in water for 40 min | 134.7 g | 33.6 g |

The invention claimed is:

1. A forward osmosis membrane comprising: a hydrophilic porous support layer comprising one or more aramid polymers;
   a woven or non-woven mesh embedded in the support layer; and
   a first polyamide rejection layer, wherein the support layer and the rejection layer are incorporated into a thin film composite membrane, and are adjacent layers in the thin film composite membrane.

2. The forward osmosis membrane of claim 1, further comprising a second polyamide rejection layer in the thin film composite membrane, wherein the support layer is sandwiched between the first rejection layer and the second rejection layer.

3. The forward osmosis membrane of claim 1, wherein the membrane is configured as a flat sheet.

4. The forward osmosis membrane of claim 1, wherein the membrane is configured as a hollow fiber.

5. The forward osmosis membrane of claim 4, wherein the first polyamide rejection layer is at an outer surface of the hollow fiber.

6. The forward osmosis membrane of claim 4, wherein the first polyamide rejection layer is at an inner surface of the hollow fiber.

7. The forward osmosis membrane of claim 1, further comprising a plurality of carbon nanotubes disposed in the support layer.

8. The forward osmosis membrane of claim 1, further comprising at least one anti-fouling layer disposed on the thin film composite membrane.

9. A method of making a forward osmosis membrane, the method comprising: providing a hydrophilic support layer comprising one or more aramid polymers; embedding a woven or non-woven mesh in the support layer; and forming a polyamide rejection layer on the support layer by an interfacial polymerization process to form a thin film composite membrane.

10. A method of filtering fluids, the method comprising:
    providing a forward osmosis membrane, the forward osmosis membrane comprising:
      a hydrophilic porous support layer comprising one or more aramid polymers;
      a woven or non-woven mesh embedded in the support layer; and
      a first polyamide rejection layer, wherein the support layer and the rejection layer are incorporated into a thin film composite membrane, and are adjacent layers in the thin film composite membrane; and
    exposing a feed solution to the forward osmosis membrane, wherein the feed solution comprises water and a solute;
    exposing a draw solution comprising water to the forward osmosis membrane such that at least some of the water from the feed solution flows through the forward osmosis membrane to the draw solution, increasing a concentration of the solute in the feed solution.

11. The method of claim 10 further comprising performing pressure retarded osmosis by generating a pressure change, energy, or combinations thereof due, at least in part, to a flow of water through the forward osmosis membrane.

12. The method of claim 10 wherein the solute in the feed solution is an industrial product, waste, or combination thereof.

13. The forward osmosis membrane of claim 1, wherein the forward osmosis membrane is sealed to a hydration bag.

* * * * *

UNITED STATES PATENT AND TRADEMARK OFFICE
CERTIFICATE OF CORRECTION

PATENT NO.       : 8,920,654 B2
APPLICATION NO.  : 13/200780
DATED            : December 30, 2014
INVENTOR(S)      : Ravindra Revanur et al.

Page 1 of 1

It is certified that error appears in the above-identified patent and that said Letters Patent is hereby corrected as shown below:

On Title Page, Item (75), under "Inventors", in Column 1, Line 1, delete "Freemont" and insert -- Fremont --, therefor.

Signed and Sealed this
Twenty-seventh Day of October, 2015

Michelle K. Lee
*Director of the United States Patent and Trademark Office*